(12) United States Patent
Susca et al.

(10) Patent No.: US 12,492,662 B2
(45) Date of Patent: Dec. 9, 2025

(54) FUEL PUMP WITH BUILT-IN THERMAL BYPASS

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/588,810

(22) Filed: Feb. 27, 2024

(65) Prior Publication Data

US 2025/0270959 A1    Aug. 28, 2025

(51) Int. Cl.

| | |
|---|---|
| F02C 7/232 | (2006.01) |
| F02C 7/22 | (2006.01) |
| F02C 7/236 | (2006.01) |
| F02C 9/28 | (2006.01) |
| B01D 35/00 | (2006.01) |

(52) U.S. Cl.
CPC ............ *F02C 7/232* (2013.01); *F02C 7/22* (2013.01); *F02C 7/236* (2013.01); *F02C 9/28* (2013.01); *B01D 35/005* (2013.01)

(58) Field of Classification Search
CPC .......... F02C 7/236; F02C 7/222; F02C 7/232; F02C 9/26; F02C 9/28
See application file for complete search history.

(56) References Cited

U.S. PATENT DOCUMENTS

| | | | | |
|---|---|---|---|---|
| 5,116,362 | A * | 5/1992 | Arline | F02C 7/236 60/734 |
| 6,102,001 | A | 8/2000 | McLevige | |
| 6,487,847 | B1 * | 12/2002 | Snow | F02K 3/10 60/764 |
| 6,584,762 | B2 * | 7/2003 | Snow | F02K 3/10 60/204 |
| 6,651,441 | B2 * | 11/2003 | Reuter | F02C 7/32 417/292 |
| 6,810,674 | B2 | 11/2004 | Clements | |
| 8,408,233 | B2 * | 4/2013 | Reuter | F02C 9/263 137/565.33 |
| 8,893,466 | B2 * | 11/2014 | Reuter | F02C 9/263 60/734 |
| 9,091,212 | B2 * | 7/2015 | Veilleux, Jr. | F02C 9/263 |
| 9,512,783 | B2 * | 12/2016 | Veilleux, Jr. | F02C 9/30 |

(Continued)

FOREIGN PATENT DOCUMENTS

EP          4520941 A1       3/2025

OTHER PUBLICATIONS

GB Search Report for GB Application No. GB2502727.7, dated Aug. 26, 2025, pp. 1-5.

*Primary Examiner* — Alain Chau
(74) *Attorney, Agent, or Firm* — CANTOR COLBURN LLP

(57) ABSTRACT

A fuel delivery system for a gas turbine engine includes a fuel source, a main fuel pump configured to deliver a first flow of fuel to a combustor assembly of the gas turbine engine, a main fuel filter positioned upstream of the main fuel pump, and an actuation pump disposed upstream of the main fuel filter and configured to deliver a second flow of fuel from the fuel source to one or more actuation devices of the gas turbine engine.

17 Claims, 2 Drawing Sheets

(56) References Cited

U.S. PATENT DOCUMENTS

| | | | |
|---|---|---|---|
| 10,215,097 B2* | 2/2019 | Miller | F02C 7/14 |
| 2003/0074884 A1* | 4/2003 | Snow | F02C 9/48 |
| | | | 60/764 |
| 2003/0136103 A1* | 7/2003 | Reuter | F02C 7/236 |
| | | | 60/734 |
| 2010/0089025 A1 | 4/2010 | Baker | |
| 2010/0242431 A1* | 9/2010 | Baker | F02C 7/232 |
| | | | 417/278 |
| 2012/0234014 A1* | 9/2012 | Reuter | F02C 9/263 |
| | | | 60/773 |
| 2012/0234015 A1* | 9/2012 | Reuter | F02C 7/236 |
| | | | 60/734 |
| 2014/0290266 A1* | 10/2014 | Veilleux, Jr. | F02C 7/236 |
| | | | 60/734 |
| 2016/0138473 A1* | 5/2016 | Veilleux, Jr. | F02C 7/22 |
| | | | 137/59 |
| 2016/0201574 A1* | 7/2016 | Kelly | F02C 9/30 |
| | | | 60/734 |
| 2017/0292451 A1* | 10/2017 | Reuter | F02C 7/22 |
| 2018/0340501 A1 | 11/2018 | Ni et al. | |
| 2021/0222625 A1* | 7/2021 | O'Rorke | F02C 7/236 |
| 2022/0372967 A1* | 11/2022 | Susca | F04B 1/324 |
| 2024/0410358 A1* | 12/2024 | Susca | F04B 1/26 |

* cited by examiner

FUEL PUMP WITH BUILT-IN THERMAL BYPASS

BACKGROUND

Exemplary embodiments pertain to the art of gas turbine engines, and more particularly to fuel delivery systems of gas turbine engines.

Fuel delivery systems for gas turbine engines utilize a variety of pumps, often driven by a gearbox that extracts power from operation of the gas turbine engine to drive the pumps. The pumps include main pumps and an actuation pump. Modern aircraft require more efficient pumping systems and higher running fuel temperatures to improver overall thrust specific fuel consumption (TSFC), which is one measure of operational efficiency of the gas turbine engine and the aircraft.

Isolating the actuation pump from the high temperature main fuel flow allows for the use of a lighter, more efficient pump that requires a lower level of power extraction, but isolating the actuation pump also requires a cooling loop to prevent thermal runaway of the actuation pump.

BRIEF DESCRIPTION

In one exemplary embodiment, a fuel delivery system for a gas turbine engine includes a fuel source, a main fuel pump configured to deliver a first flow of fuel to a combustor assembly of the gas turbine engine, a main fuel filter positioned upstream of the main fuel pump, and an actuation pump disposed upstream of the main fuel filter and configured to deliver a second flow of fuel from the fuel source to one or more actuation devices of the gas turbine engine.

Additionally or alternatively, in this or other embodiments a boost pump is positioned upstream of the main fuel filter and the actuation pump.

Additionally or alternatively, in this or other embodiments a wash filter is positioned fluidly between the boost pump and the main fuel filter.

Additionally or alternatively, in this or other embodiments the actuation pump is fed from the wash filter.

Additionally or alternatively, in this or other embodiments the second flow of fuel is urged from the one or more actuation devices to an outlet of the boost pump.

Additionally or alternatively, in this or other embodiments a thermal bypass valve is located downstream of the actuation pump and configured when activated to increase fuel flow of the second flow of fuel across the actuation pump when a temperature of the second flow of fuel exceeds a predetermined threshold, thereby decreasing the temperature of the second flow of fuel.

Additionally or alternatively, in this or other embodiments the thermal bypass valve is one of actively controlled or thermostatically controlled.

Additionally or alternatively, in this or other embodiments when the thermal bypass valve is activated the second flow of fuel is directed to the main fuel filter.

Additionally or alternatively, in this or other embodiments a high pressure relief valve is positioned downstream of the actuation pump and is configured when activated to direct the second flow of fuel toward the main fuel filter when a pressure of the second flow of fuel exceeds a predetermined threshold.

Additionally or alternatively, in this or other embodiments the actuation pump is a variable displacement pump.

In another exemplary embodiment, a gas turbine engine and fuel delivery system includes a gas turbine engine, including a turbine, and a combustor where a first flow of fuel is combusted to drive the turbine via a flow of combustion products. A fuel delivery system operably is connected to the gas turbine engine and includes a fuel source, a main fuel pump configured to deliver a first flow of fuel to the combustor, a main fuel filter positioned upstream of the main fuel pump, and an actuation pump positioned upstream of the main fuel filter and configured to deliver a second flow of fuel from the fuel source to one or more actuation devices of the gas turbine engine.

Additionally or alternatively, in this or other embodiments a boost pump is positioned upstream of the main fuel filter and the actuation pump.

Additionally or alternatively, in this or other embodiments a wash filter positioned fluidly between the boost pump and the main fuel filter.

Additionally or alternatively, in this or other embodiments the actuation pump is fed from the wash filter.

Additionally or alternatively, in this or other embodiments the second flow of fuel is urged from the one or more actuation devices to an outlet of the boost pump.

Additionally or alternatively, in this or other embodiments a thermal bypass valve is located downstream of the actuation pump and configured when activated to increase fuel flow of the second flow of fuel across the actuation pump when a temperature of the second flow of fuel exceeds a predetermined threshold, thereby decreasing the temperature of the second flow of fuel.

Additionally or alternatively, in this or other embodiments the thermal bypass valve is one of actively controlled or thermostatically controlled.

Additionally or alternatively, in this or other embodiments when the thermal bypass valve is activated the second flow of fuel is directed to the main fuel filter.

Additionally or alternatively, in this or other embodiments a high pressure relief valve is positioned downstream of the actuation pump and is configured when activated to direct the second flow of fuel toward the main fuel filter when a pressure of the second flow of fuel exceeds a predetermined threshold.

Additionally or alternatively, in this or other embodiments the actuation pump is a variable displacement pump.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
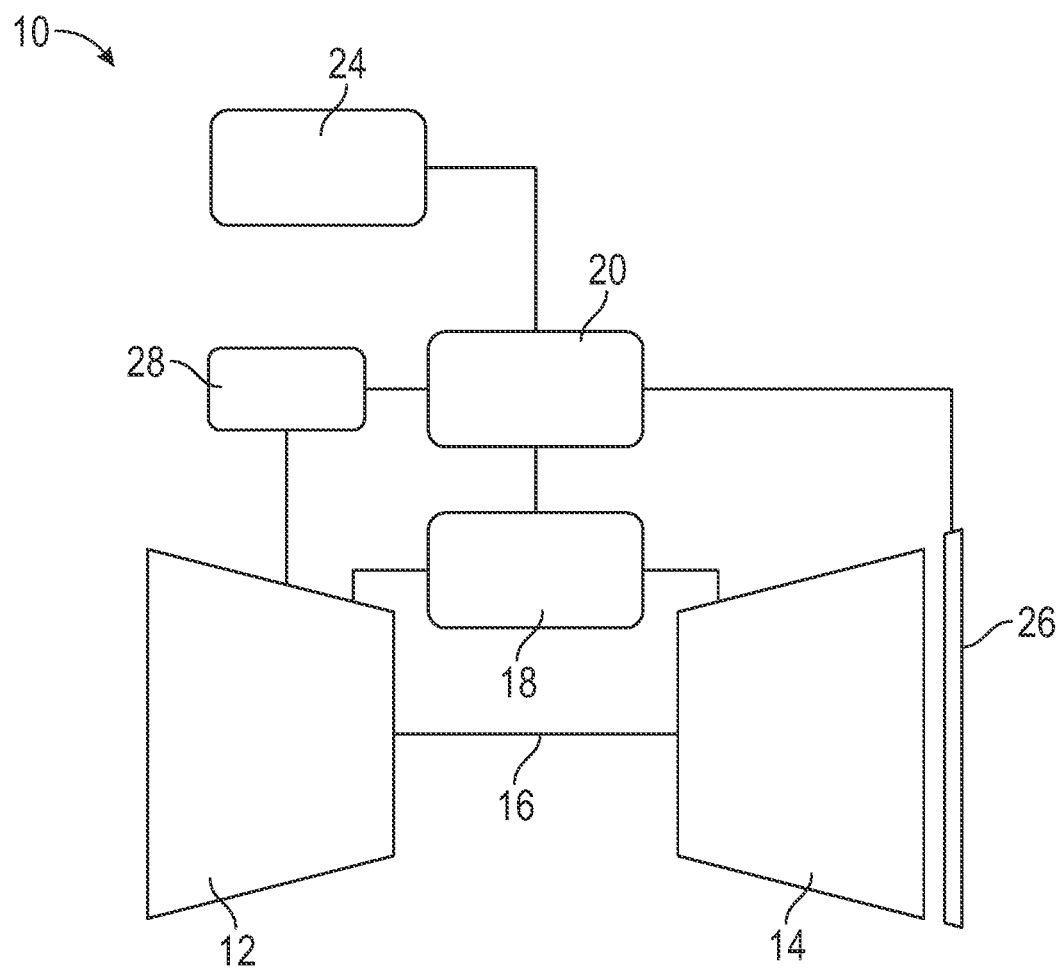
FIG. 1 is a schematic illustration of an embodiment of a gas turbine engine and fuel delivery system through which fuel is delivered to power the gas turbine engine.

An aircraft gas turbine engine system is indicated generally at 10 in FIG. 1. Gas turbine engine system 10 includes a compressor portion 12 operatively coupled to a turbine portion 14 through a shaft 16. A combustor assembly 18 is fluidically connected between the compressor portion 12 and turbine portion 14. A fuel delivery system 20 fluidically connects the combustor assembly 14 with a source of fuel 24. Fuel delivery system 20 may receive fuel directly from source of fuel 24 or, through a compressor stage (not shown) that creates an input pressure for the fuel. In addition to the combustor assembly 18, the fuel delivery system 20 is operably connected to one or more secondary components, such as an augmentor 26 to deliver a flow of fuel thereto. In some embodiments, a gearbox 28 is operably connected to the gas turbine engine 10 via, for example, the shaft 16 to extract power from the gas turbine engine 10. The fuel delivery system 20 is operably coupled to the gearbox to power components of the fuel delivery system 20.

Figure 2:
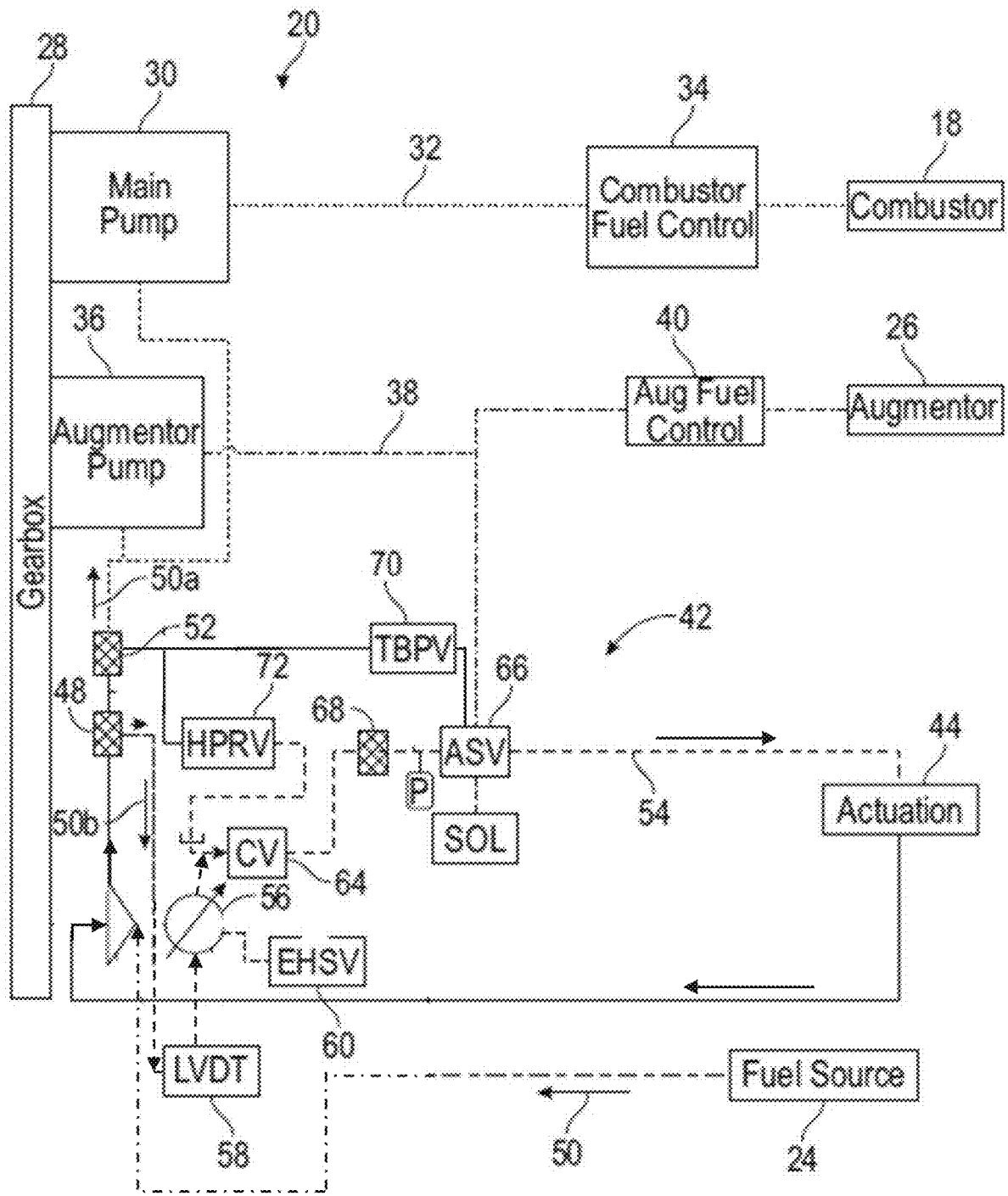
FIG. 2 is a schematic illustration of an embodiment of a fuel delivery system of a gas turbine engine.

Referring now to FIG. 2, the fuel delivery system 20 will now be described in greater detail. The fuel delivery system 20 includes a main pump 30 that directs fuel to the combustor assembly 18 via a combustor fuel line 32, with a combustor fuel control 34 located along the combustor fuel line 32 to control the flow of fuel to the combustor assembly 18. Additionally, the fuel delivery system 20 includes an augmentor pump 36 that directs fuel to the augmentor 26 via an augmentor fuel line 38, with an augmentor fuel control 40 located along the augmentor fuel line 38 to control the flow of fuel to the augmentor 26. While the present embodiment is described as including an augmentor 36, one skilled in the art will readily appreciate that this is merely exemplary, and that this arrangement may be utilized to direct fuel to another secondary component of the gas turbine engine system 10 or the aircraft. The fuel delivery system 20 further includes a boost and actuation pump system 42 utilized to boost fuel pressure of the fuel from the fuel source 24, and to provide fuel to one or more actuators 44 of the gas turbine engine system 10. Each of the main pump 30, the augmentor pump 36 and the boost and actuation pump system 42 are operably connected to the gearbox 28 as a source of power. A flow of fuel is urged from the fuel source 24 and through the boost and actuation pump system 42, and through one or more of the main pump 30 and the augmentor pump 36 for delivery to one or more of the combustor assembly 18 and the augmentor 26.

The boost and actuation pump system 42 is illustrated in FIG. 2. The system 42 includes a boost pump 46 located downstream of the fuel source 24, but upstream of the main pump 30. A flow of fuel 50 from the fuel source 24 is directed through the boost pump 46 and through a wash filter 48 downstream of the boost pump 46. From the wash filter 48, a first portion 50a of the flow of fuel is directed to a main fuel filter 52 and toward the main pump 30 and augmentor pump 36.

A second portion 50b of the flow of fuel is diverted from the wash filter 48 along an actuation circuit 54. The actuation circuit 54 includes an actuation pump 56, which in some embodiments is a variable displacement pump (VDP). The actuation pump 56 is controlled by a linear variable differential transformer (LVDT) 58 and is coupled to an electro-hydraulic servo valve (EHSV) 60. The actuation pump 56 directs the second portion 50b toward one or more actuation devices 44 to drive operation of the actuation devices 44. A check valve (CV) 64 is positioned between the actuation pump 56 and the actuation devices 44. The check valve 64 is present to protect the system in the event of failure of the actuation pump 56. The check valve 64 prevents the second portion 50b from flowing backward across the actuation pump 56 and allows the augmentor pump 36 to take over to support the actuation devices. Further excess second portion 50b may be directed toward, for example, the augmentor 26 via operation of an augmentor select valve (ASV) 66 located between an actuation filter 68 downstream of the control valve 64, and the actuation devices 62. From the actuation devices 44, the second portion 50b is circulated to an outlet of the boost pump 46 upstream of the wash filter 48.

The actuation circuit 54 includes features to control temperature of the second portion 50b flowing through the actuation circuit 54, thus preventing a thermal runaway of the actuation circuit 54. First, the actuation circuit 54 includes a thermal bypass valve (TBPV) 70 positioned along the actuation circuit 54 downstream of the actuation pump 56, for example, between the actuation filter 68 and the ASV 66. In the event of a temperature of the second portion 50b exceeding a predetermined threshold temperature, the TBPV 70 is opened, a controlled leak path is opened to increase fuel flow across the boost pump 46 and the actuation pump 56 to help reduce the second portion 50b temperature. Once the second portion 50b temperature returns to under the threshold, the TBPV 70 may be closed. The TBPV 70 may be actively controlled, or alternatively may be passively thermostatically controlled. Additionally, in some embodiments the actuation circuit 54 includes a high pressure relief valve (HPRV) 72 located downstream of the actuation pump 56 at a location, for example, upstream of the control valve 64. When a pressure of the second portion 50b in the actuation circuit 54 exceeds a predetermined threshold pressure, the HPRV 72 opens automatically, diverting the excess second portion 50b to the main fuel filter 52 and relieving the pressure in the actuation circuit 54. Once the pressure of the second portion 50b in the actuation circuit 54 is once again below the predetermined threshold, the HPRV 72 may be closed.

Placing the actuation pump 56 upstream on the main fuel filter 52 isolates the actuation pump 56 and related components, shielding the actuation circuit 54 from very high fuel temperatures. This allows for utilizing the lighter and more efficient variable displacement pump, and also reduces the fuel temperature to the actuation devices 44, which extends the service life of the actuation devices 44, or alternatively allows for a lighter actuation device to be utilized or allows for placing of the actuation devices in a hotter environment.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fuel delivery system for a gas turbine engine, comprising:
   a fuel source;
   a main fuel pump configured to deliver a first flow of fuel to a combustor assembly of the gas turbine engine;
   a main fuel filter disposed upstream of the main fuel pump;
   an actuation pump disposed upstream of the main fuel filter and configured to deliver a second flow of fuel from the fuel source to one or more actuation devices of the gas turbine engine; and
   a thermal bypass valve located downstream of the actuation pump and configured to be activated when a temperature of the second flow of fuel exceeds a predetermined threshold, to increase a volume of the second flow of fuel through the actuation pump, thereby decreasing the temperature of the second flow of fuel;
   wherein when the thermal bypass valve is activated the second flow of fuel is directed to the main fuel filter.

2. The fuel delivery system of claim 1, further comprising a boost pump positioned upstream of the main fuel filter and the actuation pump.

3. The fuel delivery system of claim 2, further comprising a wash filter disposed fluidly between the boost pump and the main fuel filter.

4. The fuel delivery system of claim 3, wherein the actuation pump is fed from the wash filter.

5. The fuel delivery system of claim 2, wherein the second flow of fuel is urged from the one or more actuation devices to an outlet of the boost pump.

6. The fuel delivery system of claim 1, wherein the thermal bypass valve is one of actively controlled or thermostatically controlled.

7. The fuel delivery system of claim 1, further comprising a high pressure relief valve disposed downstream of the actuation pump and configured when activated to direct the second flow of fuel toward the main fuel filter when a pressure of the second flow of fuel exceeds a predetermined threshold.

8. The fuel delivery system of claim 1, wherein the actuation pump is a variable displacement pump.

9. A gas turbine engine and fuel delivery system, comprising:
   a gas turbine engine, including:
      a turbine; and
      a combustor where a first flow of fuel is combusted to drive the turbine via a flow of combustion products; and
      a fuel delivery system operably connected to the gas turbine engine, including:
         a fuel source;
         a main fuel pump configured to deliver a first flow of fuel to the combustor;
         a main fuel filter disposed upstream of the main fuel pump;
         an actuation pump disposed upstream of the main fuel filter and configured to deliver a second flow of fuel from the fuel source to one or more actuation devices of the gas turbine engine; and
         a thermal bypass valve located downstream of the actuation pump and configured to be activated when a temperature of the second flow of fuel exceeds a predetermined threshold, to increase a volume of the second flow of fuel through the actuation pump, thereby decreasing the temperature of the second flow of fuel;
         wherein when the thermal bypass valve is activated the second flow of fuel is directed to the main fuel filter.

10. The gas turbine engine and fuel delivery system of claim 9, further comprising a boost pump positioned upstream of the main fuel filter and the actuation pump.

11. The gas turbine engine and fuel delivery system of claim 10, further comprising a wash filter disposed fluidly between the boost pump and the main fuel filter.

12. The gas turbine engine and fuel delivery system of claim 11, wherein the actuation pump is fed from the wash filter.

13. The gas turbine engine and fuel delivery system of claim 10, wherein the second flow of fuel is urged from the one or more actuation devices to an outlet of the boost pump.

14. The gas turbine engine and fuel delivery system of claim 9, wherein the thermal bypass valve is one of actively controlled or thermostatically controlled.

15. The gas turbine engine and fuel delivery system of claim 9, further comprising a high pressure relief valve disposed downstream of the actuation pump and configured when activated to direct the second flow of fuel toward the main fuel filter when a pressure of the second flow of fuel exceeds a predetermined threshold.

16. The gas turbine engine and fuel delivery system of claim 9, wherein the actuation pump is a variable displacement pump.

17. A fuel delivery system for a gas turbine engine, comprising:
   a fuel source;
   a main fuel pump configured to deliver a first flow of fuel to a combustor assembly of the gas turbine engine;
   a main fuel filter disposed upstream of the main fuel pump;
   an actuation pump disposed upstream of the main fuel filter and configured to deliver a second flow of fuel from the fuel source to one or more actuation devices of the gas turbine engine; and
   a thermal bypass valve located downstream of the actuation pump and configured to be activated when a temperature of the second flow of fuel exceeds a predetermined threshold;
   wherein when the thermal bypass valve is activated the second flow of fuel is directed to the main fuel filter.

* * * * *